United States Patent
Yin et al.

(10) Patent No.: US 10,790,731 B2
(45) Date of Patent: Sep. 29, 2020

(54) METHODS OF DEPOSITING COATINGS ON ELECTRICAL MACHINE COMPONENTS

(71) Applicant: GENERAL ELECTRIC COMPANY, Schenectady, NY (US)

(72) Inventors: Weijun Yin, Niskayuna, NY (US); Anil Raj Duggal, Niskayuna, NY (US); Aharon Yakimov, Niskayuna, NY (US); Holly Ann Comanzo, Niskayuna, NY (US); Vijay Kumar Srivastava, Niskayuna, NY (US); Mohandas Nayak, Bangalore (IN); Hao Huang, Troy, OH (US); Oltea Puica Siclovan, Rexford, NY (US); Paul Michael Smigelski, Jr., Glenville, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 216 days.

(21) Appl. No.: 15/993,263

(22) Filed: May 30, 2018

(65) Prior Publication Data

US 2019/0372441 A1    Dec. 5, 2019

(51) Int. Cl.
*H02K 15/10* (2006.01)
*C25D 13/02* (2006.01)
(Continued)

(52) U.S. Cl.
CPC ............. *H02K 15/10* (2013.01); *C25D 13/02* (2013.01); *C25D 13/12* (2013.01); *H02K 3/30* (2013.01); *H02K 3/345* (2013.01)

(58) Field of Classification Search
CPC .......... H02K 15/10; H02K 3/30; H02K 3/345; H02K 5/1675; H02K 1/04; H02K 15/12;
(Continued)

(56) References Cited

U.S. PATENT DOCUMENTS 3,926,760 A    12/1975  Allen et al.
4,861,657 A *   8/1989  Nishino .............. C03C 10/0036
                                                    428/336

(Continued)

FOREIGN PATENT DOCUMENTS

CN        202663272 U    1/2013
RU          2593600 C1   8/2016
(Continued)

OTHER PUBLICATIONS

European Search Report and Opinion for EP 19176613.8 dated Feb. 13, 2020 (10 pages).

(Continued)

*Primary Examiner* — Xiuyu Tai
(74) *Attorney, Agent, or Firm* — John P. Darling; The Small Patent Law Group, LLC

(57) ABSTRACT

A method of forming a coating on a component of an electrical machine is presented. The method includes coating a surface of the component with a ceramic material, via an electrophoretic process, to form a first coating. The method further includes contacting the first coating deposited by the electrophoretic process with a polymeric material to form a second coating. The method furthermore includes curing or melting the polymeric material in the second coating to form the coating including the ceramic material dispersed in a polymer matrix.

20 Claims, 8 Drawing Sheets

(51) Int. Cl.
*C25D 13/12* (2006.01)
*H02K 3/30* (2006.01)
*H02K 3/34* (2006.01)

(58) Field of Classification Search
CPC ........ C25D 13/02; C25D 13/12; C09D 5/448; C09D 7/61; C09D 201/00; C08K 3/013; C08K 2003/2227; C08K 2003/282; C08K 2003/385; C08K 2201/001; C08K 2201/016; C03C 10/0036; C03C 10/0045; C23D 5/00; F16C 33/043; F16J 15/3496; Y10T 428/31678; Y10T 428/265
See application file for complete search history.

(56) References Cited

U.S. PATENT DOCUMENTS

| | | | | |
|---|---|---|---|---|
| 4,975,417 | A * | 12/1990 | Koura | ............... C25D 13/02 204/491 |
| 9,303,327 | B2 | 4/2016 | Yeong et al. | |
| 9,419,502 | B2 | 8/2016 | Veronesi et al. | |
| 2013/0069478 | A1 | 3/2013 | Hamer | |
| 2013/0093296 | A1 | 4/2013 | Camilleri et al. | |
| 2014/0293554 | A1 | 10/2014 | Shashkov et al. | |
| 2015/0076951 | A1 | 3/2015 | Lynch et al. | |
| 2016/0065024 | A1 | 3/2016 | Zhang et al. | |
| 2017/0063183 | A1 | 3/2017 | Shrestha et al. | |
| 2017/0292029 | A1 * | 10/2017 | Aoki | ............... C09D 183/04 |
| 2019/0350111 | A1 | 11/2019 | Bodla et al. | |

FOREIGN PATENT DOCUMENTS

| | | |
|---|---|---|
| WO | 2016066402 A1 | 5/2016 |
| WO | 2017077536 A1 | 5/2017 |

OTHER PUBLICATIONS

Ranjan et al., "Thermal design of high power-density additively-manufactured induction motors", 2014 IEEE Energy Conversion Congress and Exposition (ECCE), Pittsburgh, Sep. 14-18, 2014, pp. 1325-1331.

Wrobel et al., "Characterising the performance of selected electrical machine insulation systems", 2015 IEEE Energy Conversion Congress and Exposition (ECCE), Montreal, Sep. 20-24, 2015, pp. 4857-4864.

* cited by examiner

METHODS OF DEPOSITING COATINGS ON ELECTRICAL MACHINE COMPONENTS

BACKGROUND

Embodiments of the disclosure generally relate to methods of depositing coatings on electrical machine components. More particularly, embodiments of the disclosure relate to methods of depositing electrically insulating coatings on electrical machine components using electrophoretic processes.

Certain electric machines, such as electric generators and motors, typically employ a combination of a rotor and a stator to convert rotational energy into electrical energy and vice versa. The electrical machines may include slotted cores (e.g., magnetic cores) having electrical conductors (e.g., coil windings) disposed in slots thereof; the cores and the electrical conductors may be electrically insulated from one another to prevent grounding of the conductors to the core. For example, insulation materials, such as polymer films and insulation papers can be used as slot liners and/or ground wall insulation to provide electrical insulation between the coil windings and the slotted core in the electric machine. However, materials with good dielectric properties often exhibit poor thermal conductivity, which hinders the dissipation of heat from the stator and/or rotor. This poor heat dissipation may result in a reduction in one or both of power generating efficiency and power density, which are the desired performance parameters of an electrical machine.

Furthermore, typical methods of forming components of an electrical machine, such as, stator assembly or coil windings involve multiple steps and multiple parts that are assembled together. Use of multiple steps and multiple parts results in cumbersome manufacturing processes, and may also affect the machine's end performance and reliability.

Accordingly, there remains a need for improved methods of manufacturing and insulating the components of the electrical machines.

BRIEF DESCRIPTION

In one aspect, the disclosure relates to a method of forming an electrically insulating coating on a component of an electrical machine. The component of the electrical machine is an additively-manufactured stator component or a rotor component. The method includes coating a surface of the component with a ceramic material including a nitride, via an electrophoretic process, to form a first coating. The method further includes contacting the first coating deposited by the electrophoretic process with a thermoset resin to form a second coating; and curing the second coating to form the electrically insulating coating including the ceramic material dispersed in a polymer matrix.

In another aspect, the disclosure relates to a component of an electrical machine including a surface coated with an electrically insulating coating using the method described herein.

In another aspect, the disclosure relates to a method of forming a coating on a component of an electrical machine. The method includes coating a surface of the component with a ceramic material, via an electrophoretic process, to form a first coating. The method further includes contacting the first coating deposited by the electrophoretic process with a polymeric material to form a second coating; and post-processing the second coating to form the coating including the ceramic material dispersed in a polymer matrix.

DRAWINGS

These and other features, aspects, and advantages of the present disclosure will become better understood when the following detailed description is read with reference to the accompanying drawings, wherein.

DETAILED DESCRIPTION

Figure 1:
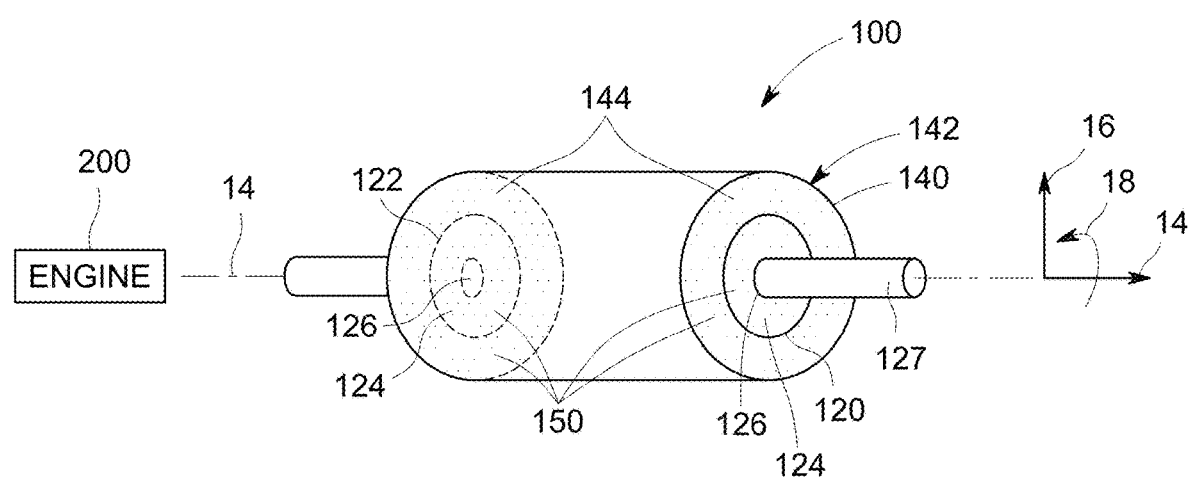
FIG. 1 illustrates a perspective view of an engine coupled to a generator that includes an electrically insulating coating disposed within, in accordance with some embodiments of the disclosure.

In the following specification and the claims, which follow, reference will be made to a number of terms, which shall be defined to have the following meanings. The singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

Approximating language, as used herein throughout the specification and claims, may be applied to modify any quantitative representation that could permissibly vary without resulting in a change in the basic function to which it is related. Accordingly, a value solidified by a term or terms, such as "about", and "substantially" is not to be limited to the precise value specified. In some instances, the approximating language may correspond to the precision of an instrument for measuring the value. Similarly, "free" may be used in combination with a term, and may include an insubstantial number, or trace amounts, while still being considered free of the solidified term. Here and throughout the specification and claims, range limitations may be combined and/or interchanged, such ranges are identified and include all the sub-ranges contained therein unless context or language indicates otherwise. The terms "disposed inside" or "disposed in" refer to configurations in which at least portion of a component is disposed inside or within a portion of another component, and does not necessarily connotate that the entirety of the component needs to be disposed within another component. For example, the counter electrode may be completely disposed inside the stator/rotor core or may be partially disposed inside the stator/rotor core. Similarly, a portion of the stator/rotor coil may be disposed in the stator/rotor slots and another portion may be disposed outside the stator/rotor slots.

A method of forming a coating on a component of an electrical machine is presented. The method includes coating a surface of the component with a ceramic material, via an electrophoretic process, to form a first coating. The method further includes contacting the first coating deposited by the electrophoretic process with a thermoset resin to form a second coating. The method furthermore includes heat-treating the second coating to form the coating including the ceramic material dispersed in a polymer matrix.

Non-limiting examples of suitable electrical machines include a motor, a generator, a transformer, a toroid, an inductor, and combinations thereof. In certain embodiments, an electric machine refers to an electric motor that converts electric power to mechanical power or to an electric generator that converts mechanical power to electric power. In general, the electric machine includes a rotor, a stator, and windings. It may be noted that the term "windings" typically refers to electrically insulated conductors wound into a coil. However, in the present disclosure, the terms "stator coil" and "rotor coil" are used herein for "stator windings" and "rotor windings", irrespective of the method employed to form the windings. For example, the terms "stator coil" or "stator windings" are used herein for additively manufactured windings as well, even though these windings may not be manufactured using the conventional winding methods. Therefore, the term "stator coil" refers to stator windings and the term "rotor coil" refers to rotor windings, independent of the method used for fabricating the windings.

FIG. 1 is a perspective view of an embodiment of an electric machine 100 (e.g., electric generator 100) coupled to an engine 200 (e.g., an engine of an automobile or an aircraft). While the illustrated electric machine 100 is an electric generator, it may be appreciated that the methods discussed herein are applicable to other electric machines, such as electric motors. In the illustrated embodiment, the electric generator 100 may be described relative to an axial direction 14, a radial direction 16, and a circumferential direction or an annular direction 18. The electric generator 100 includes a rotor assembly 120 and a stator assembly 140, which may be concentrically aligned about the axial direction 14 of the electric machine 10. The rotor assembly 120 is configured to rotate in the circumferential direction 18 relative to the stator assembly 140. The rotational energy (e.g., the relative rotation between the rotor assembly 120 and the stator assembly 140) is converted to electrical current in armature or power generation coil within the stator or rotor assembly, depending on the design of the generator 100.

Figure 3:
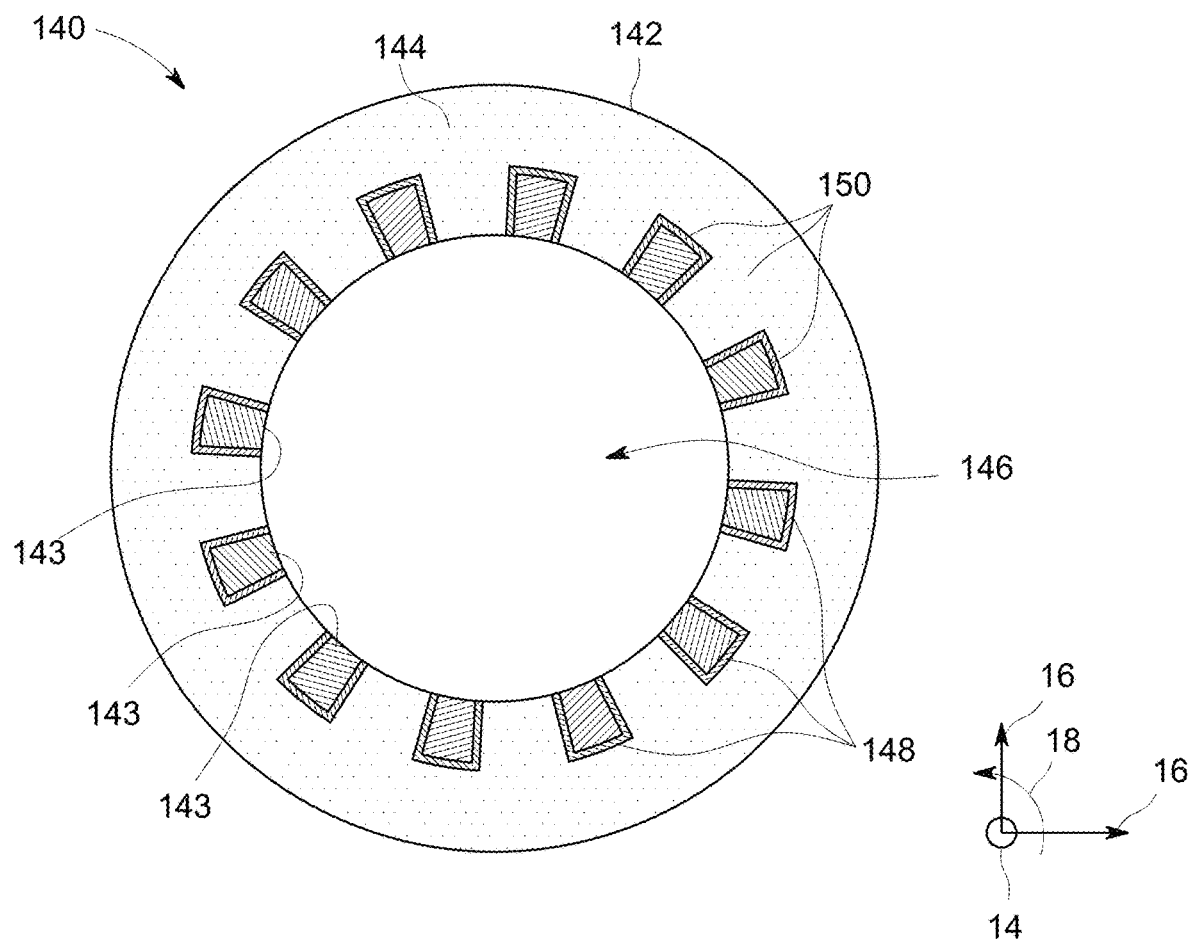
FIG. 3 illustrates a partial front view of a stator assembly of an electrical machine, in accordance with some embodiments of the disclosure.
Figure 4:
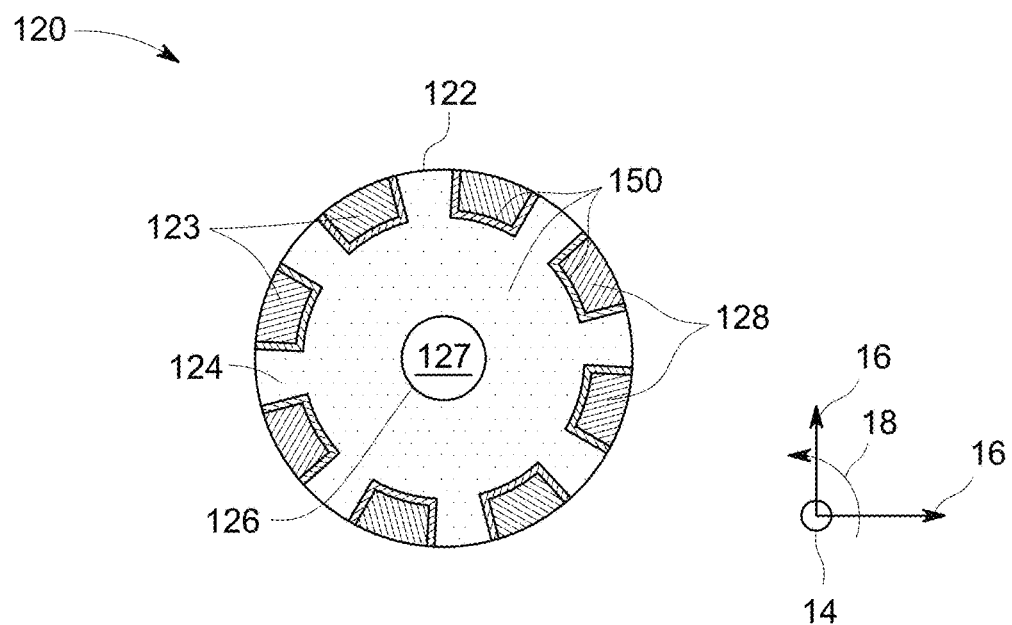
FIG. 4 illustrates a partial front view of a rotor assembly of an electrical machine, in accordance with some embodiments of the disclosure.

The rotor assembly 120 includes a rotor core 122 that has end faces 124. The rotor core 122 includes a bore 126. The rotor assembly is mounted on a shaft 127 such that the rotor core 122 rotates together with the shaft 127. The stator assembly 140 includes a stator core 142 having end faces 144. Further, the rotor assembly 120 and the stator assembly 140 generally both include coil windings, which are illustrated and discussed below with respect to FIGS. 2-4. In certain embodiments, the rotor assembly 120 includes field windings that generate a magnetic field, and the stator assembly 140 includes armature or power generation windings that generate electrical power as the rotor assembly 120 rotates. In other embodiments, the stator assembly 140 may include field windings, and rotor assembly 120 may include the armature or power generation windings. As illustrated in FIGS. 3-4, and discussed below, at least a portion of the rotor core 122, the stator core, 142, the rotor coil 123, and the stator coil 143 may be coated with a coating 150. In the embodiment illustrated in FIG. 1, the coating 150 is illustrated as being in contact with both the rotor core 122 and the stator core 142. However, embodiments wherein the coating 150 is in contact with only one of the rotor core 122 or the stator core 142 are also envisaged within the scope of the disclosure. Similarly, embodiments wherein the coating 150 is in contact with only one of the rotor coil 123 and the stator coil 143 are also envisaged within the scope of the disclosure. Further, the coating 150 may be coated on the entire surface or only a portion of the surface of the rotor core 122, the stator core 142, the rotor coil 123, or the stator coil 143.

Figure 2:
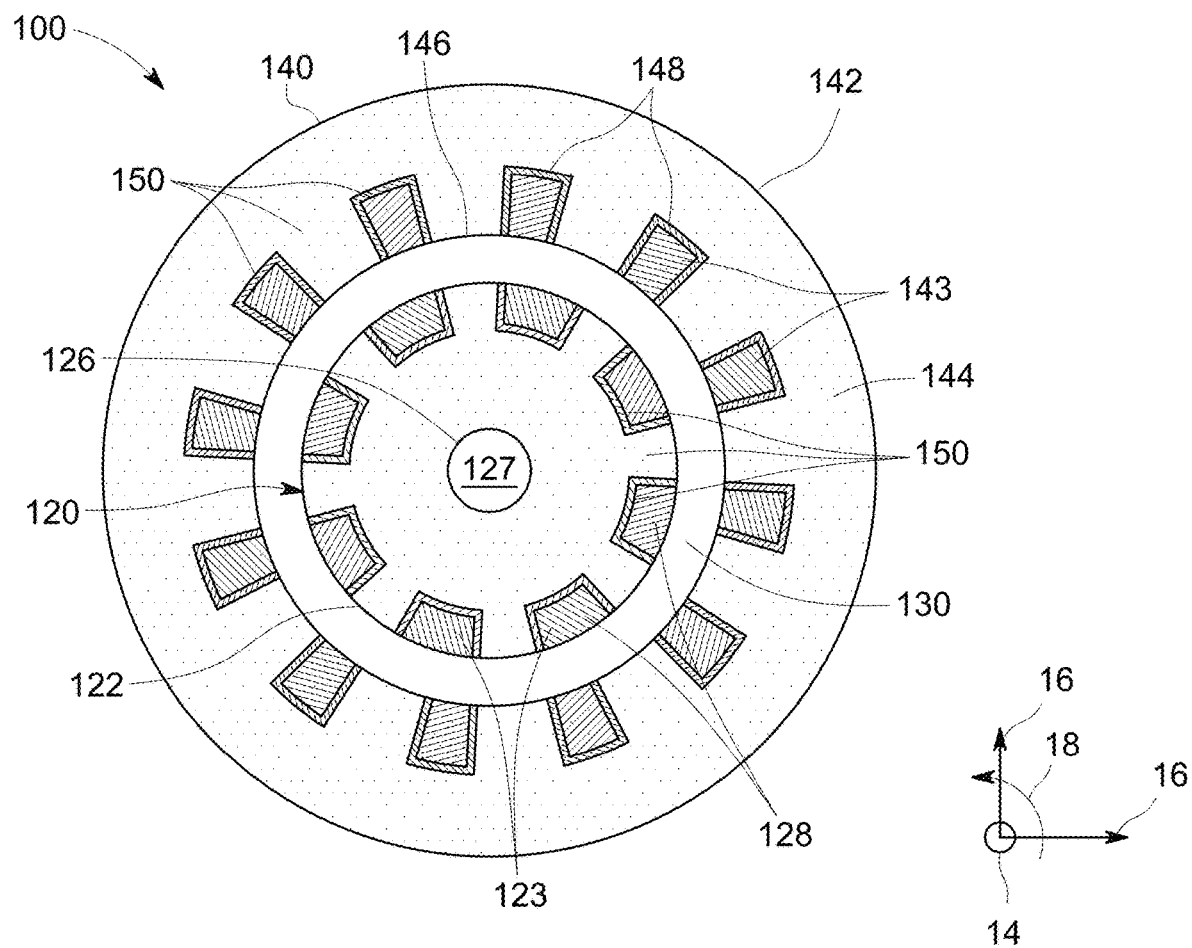
FIG. 2 illustrates a partial front view of a stator assembly and a rotor assembly of an electrical machine, in accordance with some embodiments of the disclosure.

FIG. 2 is a front view of the stator assembly 140 and the rotor assembly 120 of the embodiment of the generator 100, illustrated in FIG. 1. The stator assembly 140 may include the stator core 142 having the end faces 144, an axially extending bore 146 (e.g., extending in the axial direction 14), and a plurality of slots or stator slots 148 that extend radially (e.g., in radial directions 16) away from the bore 146, and extend axially (e.g., in the axial direction 14) through the stator core 142. The stator core 142 may be formed from a series of laminations (e.g., laminated steel) or may take on other suitable forms, e.g., a unitary structure manufactured using an additive manufacturing technique. The illustrated stator assembly 140 includes stator coil (also referred to as stator windings) 143 having portions extending axially through the stator slots 148. The rotor assembly 120 is disposed within the bore 146 and extends axially along the bore 146. The illustrated rotor assembly 120 includes the rotor core 122 and a plurality of rotor slots 128 that extend radially (e.g., in radial directions 16) toward the shaft 127, and extend axially (e.g., in the axial direction 14) through the rotor core 122. There is typically a gap 130 (e.g., an air gap) present between the rotor assembly 120 and the stator core 142. The illustrated rotor assembly 120 includes rotor coil (also referred to as rotor windings) 123 having portions extending axially through the slots 128. The rotor coil 123 may be either a field coil or a power generation coil, depending on the electrical machine arrangement. In some embodiments, the coating 150 may be selectively coated onto portions of the surfaces of the rotor core, 122, the rotor coil 123, the stator core 142, the stator coil 143, or combinations thereof. The different alternative configurations of the coated portions of the electrical machine 100 are further described herein with reference to FIGS. 3-4.

FIG. 3 illustrates embodiments in which the coating 150 is selectively coated onto portions of the surfaces of one or both of the stator core 142 and the stator coil 143. In some embodiments, the coating 150 may coated on at least a portion of the surfaces of the slots 148 of the stator core 142. In some embodiments, the coating 150 may be additionally coated on at least a portion of the end faces 144 of the stator core 142. In some embodiments, the coating 150 may be additionally or alternatively coated on at least a portion of the stator coil 143. In certain embodiments, the coating 150 provides electrical insulation between the stator coil 143 and the stator core 142. In some such embodiments, the coating 150 may also dissipate heat from the stator assembly 140. As described in detail later, the coating 150 may be coated on the surfaces, either before the assembly of the stator core 142 and the stator coil 143 to form the stator assembly 140, or after the assembly of the stator core and the stator coil 143.

FIG. 4 illustrates embodiments in which the coating 150 is selectively coated onto portions of the surfaces of one or both of the rotor core 122 and the rotor coil 123. In some embodiments, the coating 150 may coated on at least a portion of the surfaces of the slots 128 of the rotor core 122. In some embodiments, the coating 150 may be additionally coated on at least a portion of the end faces 124 of the rotor core 122. In some embodiments, the coating 150 may be additionally or alternatively coated on at least a portion of the rotor coil 123. In certain embodiments, the coating 150 provides electrical insulation between the rotor coil 123 and the rotor core 122. In some such embodiments, the coating 150 may also dissipate heat from the rotor assembly 120. As described in detail later, the coating 150 may be coated on the surfaces, either before the assembly of the rotor core 122 and the rotor coil 123, or after the assembly of the rotor core 122 and the rotor coil 123.

In some embodiments, a method of forming an electrically insulating coating on a component of an electrical machine is presented. In such embodiments, the coating 150, as described herein earlier, is electrically insulating. The term "electrically insulating coating" as used herein refers to a coating capable of providing electrical insulation between the stator/rotor slots and the stator/rotor windings. The electrically insulating coating may be characterized by a volume electric resistivity equal to or greater than $10^8$ ohm centimeters, in some embodiments. In some such embodiments, the coating 150 may be further thermally conductive.

The component of the electrical machine may be manufactured using any suitable method, such as, for example, including the steps of winding, enameling, lamination and the like. In certain embodiments, the component of the electrical machine is an additively-manufactured stator component or a rotor component.

The term "additively-manufactured component" as used herein refers to a component formed using an additive manufacturing technique. "Additive manufacturing" is a term used herein to describe a process which involves layer-by-layer construction or additive fabrication (as opposed to material removal as with conventional machining processes). Such processes may also be referred to as "rapid manufacturing processes". The additive manufacturing process forms net or near-net shape structures through sequentially and repeatedly depositing and joining material layers. As used herein the term "near-net shape" means that the additively manufactured structure is formed very close to the final shape of the structure, not requiring significant traditional mechanical finishing techniques, such as machining or grinding following the additive manufacturing process. In certain embodiments, suitable additive manufacturing processes include, but are not limited to, the processes known to those of ordinary skill in the art as direct metal laser melting (DMLM), direct metal laser sintering (DMLS), direct metal laser deposition (DMLD), laser engineered net shaping (LENS), selective laser sintering (SLS), selective laser melting (SLM), electron beam melting (EBM), fused deposition modeling (FDM), binder jet technology, or combinations thereof. These methods may employ, for example, and without limitation, all forms of electromagnetic radiation, heating, sintering, melting, curing, binding, consolidating, pressing, embedding, and combinations thereof.

The additively manufactured component may be further characterized as having a unitary structure. The term "unitary structure" as used herein refers to a structure wherein all of the structural features of such structure are integral with each other. As used herein, the term "integral" means that the different geometric and structural features that define the unitary structure are formed together as features of a single, continuous, undivided structure, as opposed to previously formed or otherwise manufactured components that are assembled together or otherwise joined or affixed together using one or more of various joining means to yield a final assembled product. Thus, the different structural or geometric features of the unitary structure are not attached to or affixed to each other, e.g., bolted to, welded to, brazed to, bonded to, or the like.

The additive manufacturing processes may be used on suitable materials (for example, metal-based materials) to form the components of the electrical machine. These materials may be used in these methods and systems in a variety of forms as appropriate for a given material and method or, including for example without limitation, liquids, solids, powders, sheets, foils, tapes, filaments, pellets, liquids, slurries, wires, atomized, pastes, and combinations of these forms.

Conventionally, stator and rotor assemblies are assembled using multiple, sequential steps and components. For example, conventionally, stator assemblies are assembled by sequentially inserting slot liner insulation, windings, and wedges into each stator slot, which can be a cumbersome and time-consuming process. This multistep process may further lead to one or more of poor copper winding dimensional tolerance, low copper fill factor, or insulation damage due to severe mechanical stresses during manufacturing and assembly, thereby affecting the robustness and reliability of the insulation. In accordance with some of the embodiments described herein, the electrical machine components may be precisely printed and assembled, using additive manufacturing techniques, and thus the methods describe herein may reduce or eliminate some of the assembly steps such as enameling, winding, laminating, and the like.

Further, the methods and coatings, in accordance with some of the embodiments described herein address the noted shortcomings in conventional coatings and related deposition methods, at least in part, through depositing coatings via an electrophoretic process on components of the electrical machines using a two-step process. This is in contrast to typical electrophoretic processes that employ a single step to deposit a filler/particle and polymer matrix. As noted earlier, the method includes coating a surface of the component with a ceramic material, via an electrophoretic process, to form a first coating. In some embodiments, the method includes coating a surface of the component with a ceramic material including a nitride, via an electrophoretic process, to form the first coating.

Figure 5:
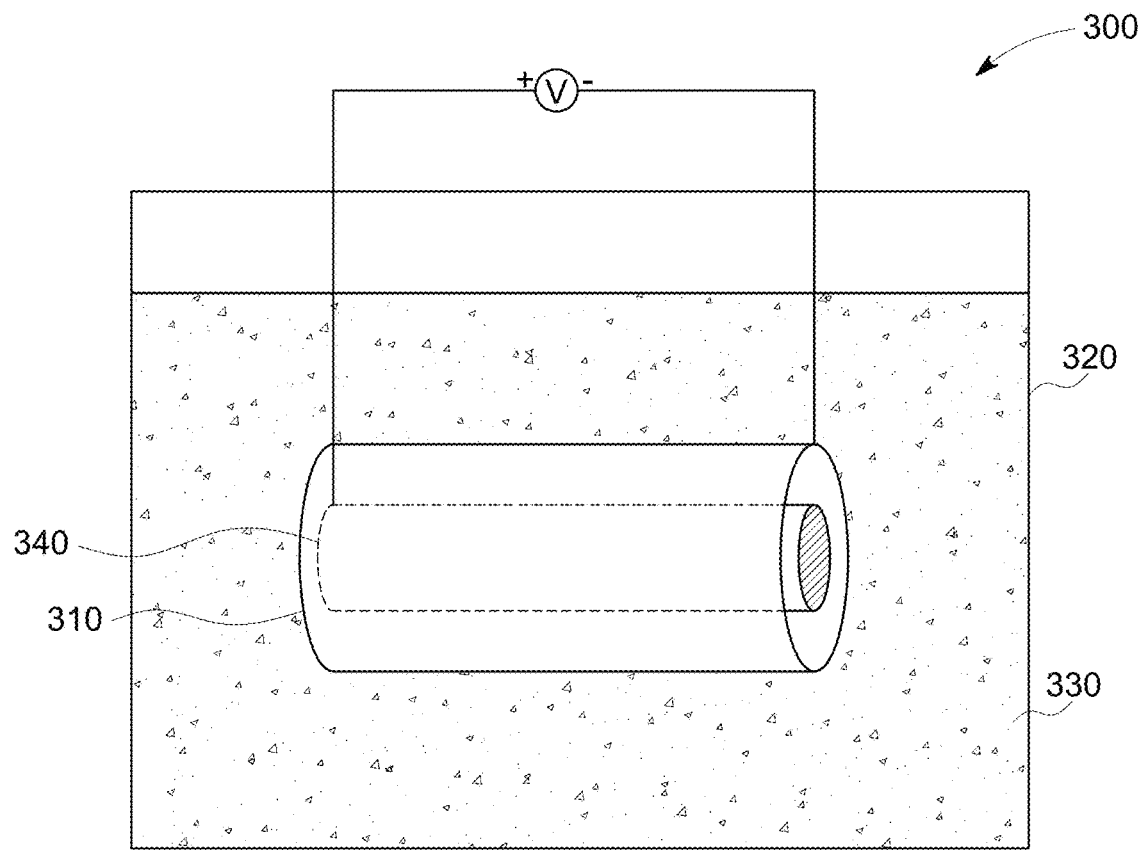
FIG. 5 illustrates a schematic of an electrophoretic process for coating a component of an electrical machine, in accordance with some embodiments of the disclosure.

The electrophoretic process employed in accordance with some embodiments of the disclosure is further described herein with reference to FIG. 5. The electrophoretic process may involve submerging the component 310 of the electrical machine 100 (shown in FIG. 1) into a container 320 that holds a coating composition 330, and applying an electrical current through the coating composition 330. Typically, the component 310 to be coated serves as one of the electrodes (e.g., anode or cathode), and one or more suitable counter-electrodes are used to complete the circuit. For example, in FIG. 5, a single counter electrode 340 is illustrated that completes the circuit. There are two principles types of electrophoretic processes, anodic and cathodic. In the anodic electrophoretic process, negatively charged materials in the coating composition 330 are deposited on a positively charged workpiece, while in the cathodic process, positively charged materials in the coating composition 330 are deposited on a negatively charged workpiece. The component 310 in FIG. 5, in accordance with some embodiments of disclosure, can be at least one of the stator core 142, the rotor core 122, the stator coil 143, and the rotor coil 123, as described herein earlier.

In some embodiments, the coating composition 330 includes a ceramic material in a suitable solvent. In some embodiments, the ceramic material is a thermally conductive ceramic material. The term "thermally conductive ceramic material" refers to a ceramic material having a thermal conductivity greater than 10 W/mK. Non-limiting examples of a suitable thermally conductive ceramic material include aluminum nitride, boron nitride, diamond, aluminum oxide, or combinations thereof. In certain embodiments, the ceramic material includes a nitride. Non-limiting examples of a suitable nitride includes aluminum nitride, boron nitride, or a combination thereof.

The ceramic material may be in any suitable form, such as particles, nanotubes (e.g., nanotubes of single and/or multiple walls, nanotubes of different chirality), nanofibers, nanowires, nanowhiskers, irregular shapes, etc. The sizes (e.g., diameter, length, width, characteristic length, aspect ratio) of the ceramic material may also be in any suitable range, from nanometer range to micrometer range. Non-limiting examples of suitable solvents include acetylacetone, ethanol, isopropylalchol, or combinations thereof. In certain embodiments, the coating composition 330 is the form of a slurry.

One or both of the size and the concentration (e.g., volume percentage) of the ceramic material in the coating composition 330 may be tuned to increase the thermal conductivity of the coating 150 and/or control the morphology of the coating 150. Further, the stability of the coating composition 330 containing the ceramic material may be modified by changing the colloidal chemistry to form a stable coating 150 and/or to improve the morphology of the coating 150. In some embodiments, parameters, such as pH (e.g., potential of hydrogen) level and/or zeta potential (e.g., electrokinetic potential in colloidal dispersions) may be modified to change the charging behavior of the ionized groups to form a stable coating 150, for example by employing a charging agent. In some embodiments, suitable solvents, surfactants, and/or additives may be used to form a stable coating 150. In some embodiments, the viscosity of the coating composition 330 may be modified to form a stable coating and/or to improve the morphology of the coating 150. In some embodiments, suitable adhesion promoters may be added to the coating composition 330 to improve the adhesion of the ceramic particles on the surface of the component 310.

In certain embodiments, the electrophoretic process includes contacting the surface of the component 310 with a coating composition 330 including the ceramic material and a charging agent. Non-limiting examples of a suitable charging agent include iodine, polyethyleneimine, alkoxysilylalkyl-modified polyethyleneimine, silsesquioxane, or combinations thereof. Non-limiting example of an alkoxylsiylalkyl-modified polyethylene amine includes trimethoxysilylpropyl-modified polyethyleneimine (TMSP-PEI), commercially available from Gelest Inc. Morisville, Pa., USA. Non-limiting example of a silisequioxane includes aminoethylamino/vinyl/silsesquioxane in aqueous solution, commercially available from Gelest Inc. Morisville, Pa., USA. In some embodiments, the charging agent may include one or more functional groups that may further function as adhesion promoters. The amount of the ceramic material in the coating composition 330 may be in a range from about 0.02 g/mL to about 0.5 g/mL. In certain embodiments, the amount of the ceramic material in the coating composition 330 may be in a range from about 0.03 g/mL to about 0.2 g/mL. The coating composition 330 may be further characterized by the amount of the charging agent with respect to the ceramic material. In some embodiments, the amount of the charging agent with respect to the ceramic material is in a range from about 10 μL/g to about 60 μL/g. In some embodiments, the thickness of the first coating may be varied by controlling the amount of the ceramic material in the coating composition 330. Further, the stability and/or the morphology of the coating may be controlled by adding the charging agent in the coating composition 330. In certain embodiments, greater than 10 μL/g of the charging agent (e.g., PEI) may be added to the coating composition to preclude formation of dry cracks in the first coating.

Before the electrophoretic process, the component 310 may be prepared to make the component 310 more suitable for the coating process. In some embodiments, the preparation includes applying one or more masks (e.g., masking tape) on the component 310 to be coated before submerging the component 310 to be coated into the coating composition 330. For example, before submerging the stator core 142 into the coating composition 330, if only the surfaces of the stator slots 148 are to be coated, one or more masks may be applied to the stator core 142 to cover other surfaces that are not to be coated, such that these surfaces are not in contact with the coating composition 330. In some embodiments, the preparation may also include any suitable cleaning processes to clean the component 310 to be coated or applying a suitable pre-coating, such as a primer coating, to the component 310 to be coated. A primer coating may allow for improved adhesion between the ceramic material and the surface of the component 310 to be coated.

With continued reference to FIG. 5, the method may include submerging the component 310 to be coated as one of the electrodes (e.g., anode or cathode) in the coating composition 330, and submerging a counter electrode 340 to set up a complete electrical circuit, followed by application of direct electrical current through the coating composition 330 using the electrodes 310, 340. Parameters that affect the electrophoretic process can be controlled to achieve the desired qualities for the coating 150. These parameters may include, for example, applied voltage, coating temperature, coating time, coating or deposition rate, etc. These parameters may affect the deposition kinetics to change the quality or characteristics of the coating 150 (e.g., thickness, morphology, uniformity, surface coverage, etc.). In some embodiments, the electrophoretic process may include applying an electric field in a range from about 4 Volts/mm to about 10 Volts/mm. In some embodiments, the thickness of the first coating may be varied by controlling the electric field applied.

After deposition of the ceramic material on the component 310, the coated component may be post-processed. Post-processing the coated component 310 may include rinsing the component 310 to remove excess coating composition 330 from the component 310. In certain embodiments, if one or more masks (e.g., masking tape) were applied to the coated components, the masks may be removed after the electrophoretic process.

As mentioned earlier, after the electrophoretic process, and any post-processing steps, the component 310 includes a first coating of a ceramic material deposited on a surface of the component 310. In some embodiments, the first coating includes a nitride (e.g., aluminum nitride or boron nitride) deposited on the surface of the component 310. In some embodiments, the first coating may include an interconnected network of ceramic particles and a packing density of the ceramic particles in the first coating may be greater than 50 volume %. In some embodiments, the packing density may be greater than 60 volume %. The first coating may further include voids or gaps between the ceramic particles, and these voids or gaps may be at least partially filled by impregnating a polymeric material in these voids or gaps.

In some embodiments, the deposited ceramic material may be subjected to one or more heat treatment steps before contacting the first coating with the polymeric material (described herein later). By heat treating the deposited ceramic material, partial or complete sintering of the ceramic material may be achieved, which may provide improved mechanical integrity of the deposited first coating during subsequent contacting impregnation steps. Further, partial or completely sintered ceramic material may result in improved thermal conductivity of the coating 150.

The method further includes contacting the first coating deposited by the electrophoretic process with a polymeric material to form a second coating. A polymeric material may include a thermoplastic material or a thermoset resin. In some embodiments, the polymeric material includes a thermoplastic selected from the group consisting of polyetheretherketone (PEEK), polyetherketone (PEK), polyetherketoneketone (PEKK), perfluoroalkoxy alkane (PFA), polytetrafluoroethylene (PTFE), polyethersulfone (PES), and combinations thereof. In some embodiments, the polymeric material includes a thermoset resin selected from the group consisting of epoxy, siloxane, polyester, polyurethane, cyanate ester, polyimide, polyamide, polyamideimide, polyesterimide, polyvinyl ester, and combinations thereof.

In some embodiments, the method further includes contacting the first coating deposited by the electrophoretic process with a thermoset resin to form the second coating. Non-limiting examples of suitable thermoset resin include an epoxy, a siloxane, polyester, polyurethane, cyanate ester, polyimide, polyamide, polyamideimide, polyesterimide, polyvinyl ester, or combinations thereof. In certain embodiments, the thermoset resin includes epoxy, silicone, or a combination thereof.

The first coating may be contacted with the polymeric material using any suitable technique, such as, for example an immersion process or a vacuum pressure impregnating process. The technique as well as the conditions used for the contacting step map depend, at least in part, on the characteristics of the polymeric material. For example, for a low viscosity polymeric material, such as, epoxy or silicone, an immersion process or a vacuum pressure impregnation process may be employed. However, for high-viscosity thermoplastic materials, high pressure impregnation may be employed, for example by using an autoclave. The method further includes impregnating the polymeric material (e.g., a thermoset resin) into a plurality of voids present in the first coating deposited by the electrophoretic process on the surface of the component 310, thereby forming the second coating.

Subsequently, the method further includes post-processing the second coating to form the coating 150 including the ceramic material dispersed in a polymer matrix. Post-processing of the second coating may include melting or curing the polymeric material in the second coating. Post-processing may include subjecting the second coating to any suitable treatment such that one or more of partial curing of the polymeric material, complete curing of the polymeric material, partial melting of the polymeric material, and complete melting of the polymeric material is achieved. The melting or curing of the polymeric material in the second coating may be achieved using any suitable treatments by heat, ultraviolet (UV) light, infrared (IR) light, plasma and/or electron beam energy.

In certain embodiments, the method includes curing the thermoset resin in second coating to form the electrically insulating coating 150 including the ceramic material dispersed in a polymer matrix. In some embodiments, the curing step may include suitable treatments by heat, ultraviolet (UV) light, infrared (IR) light, and/or electron beam energy to crosslink the deposited thermoset resin. Additionally, heat treatment or curing process may substantially reduce or eliminate the gaps, voids, and/or factures in the as-deposited second coating to form a continuous, conformal coating on the component 310, in some embodiments.

In some embodiments, the component 310 is the stator core 142 and the stator coil 143 (illustrated earlier in FIG. 2). In some such instances, the method includes separately coating a surface of the stator core 142 and the stator coil 143 by using the electrophoretic process, and assembling a coated stator core and a coated stator coil to form a stator assembly 140. For example, the method may include loading the stator coil 143 into the slots 148 of the stator core 142, wherein both are coated with the coating 150.

In some embodiments, the component 310 is the stator core 142 and the stator coil 143 (illustrated earlier in FIG. 2), wherein the stator coil 143 is disposed in the stator core 142 to form a stator assembly 140. In some such instances, the method includes simultaneously coating the surfaces of the stator core 142 and the stator coil 143 with the coating. In such instances, the surfaces of the stator core 142 and the stator coil 143 may be electrophoretically coated with the ceramic material by contacting the stator assembly 140 with a coating composition 330, thereby forming the first coating. The coated stator assembly may be then contacted with a polymeric material to form a second coating, which may be post-processed (e.g., cured) to form the coating 150, such as, an electrically insulating coating.

The coating 150 deposited on the component 310 of the electrical machine 100 may be further characterized by functional characteristics. For example, in some embodiments, the coating 150 may be substantially continuous and substantially uniform (e.g., uniform in terms of composition, thickness, etc.). The dielectric breakdown strength of the coating 150 may be affected by the coating thickness and/or uniformity. In particular, the dielectric breakdown strength may increase by increasing the coating 150 thickness and/or uniformity. In some embodiments, the coating 150 may have a thickness in a range of about 0.025 millimeters (mm) to about 0.5 mm. In some embodiments, the coating 150 may have a thickness in a range of about 0.05 mm to about 0.25 mm.

In some embodiments, the coating 150 may be substantially conformal, meaning it is continuous and conforms to the contours (e.g., surface features, including troughs, channels, edges, corers, and surface irregularities) of the coated component. Further, the coating 150 may be substantially free of voids and cracks. As set forth above, these morphological characteristics, as well as the thickness of the coating 150, may be controlled by modifying the parameters of electrophoretic process.

In addition, the coating 150 includes a substantial amount of the ceramic material. An amount of the thermally ceramic material in the electrically insulating coating 150 may be in a range from about 10 volume percent to about 80 volume percent. In some embodiments, an amount of the ceramic material in the electrically insulating coating 150 may be in a range from about 20 volume percent to about 60 volume percent.

In some embodiments, the thermal conductivity of the coating 150 may be greater than 0.8 W/mK. In some embodiments, the thermal conductivity of the coating 150 may be greater than 1.5 W/mK. The improved thermal conductivity may be achieved based at least in part on the distribution, packing, and/or content of the ceramic material within the coating 150.

A component of an electrical machine including a surface coated with a coating using the methods describe herein is also presented. In some embodiments, the component has a unitary structure, and the component includes a stator core, a rotor core, a stator coil, a rotor coil, or combinations thereof. The coating includes a ceramic material dispersed in a polymer matrix. FIGS. 3-4 described herein earlier illustrate the different components of the electrical machine 100 coated with the coating 150. An electrical motor including the component coated with coating 150 is also presented.

In accordance with some embodiments of the present disclosure, the coating 150 may be advantageously both thermally conductive and electrically insulating. Further, the coating 150 may be designed to be conformally deposited onto at least portions of a stator core and/or rotor core of an electrical machine to electrically isolate the stator core and/or rotor core from their respective windings. Further, the embodiments described herein may reduce or eliminate the need for additional components such as enamel coating, slot liners, wedges, and the like. In accordance with some embodiments of the present disclosure, the coating 150 and the methods of depositing the coating 150, may enable the manufacture of electric machines with improved heat dissipation, as well as improved robustness to electrical shorts because of thermal cycling fatigue.

EXAMPLES

The examples that follow are merely illustrative, and should not be construed to be any sort of limitation on the scope of the claimed invention. Unless specified otherwise, all ingredients are commercially available from common chemical suppliers.

Metal coupons were used as the substrates for electrophoretic deposition (EPD) of aluminum nitride (AlN) or boron nitride (BN). Metal coupons used were copper (Cu), aluminum (Al), steel alloy, and Hiperco 50™ magnetic material. Cu and Al are representative examples of materials used in stator/rotor windings while Hiperco 50™ is a representative example of a magnetic material used as stator/rotor core. The coupons were cut to size (2"×3"). Copper coupons are roughened with a sand paper after cutting, other material coupons are used as is. To remove cutting oil and grease from the surface, the coupons were sonicated in acetone for 10 min, followed by sonication in propanol for 10 min, and $N_2$ dry-blow with visual inspection and hand cleaning of the residuals. A 10% solution in ethanol of either Chemlok® 607 or Chemlok® AP-133 adhesive was used to prime the surface after cleaning. Primer was applied to the coupon surface using dip coating. After the surface preparation, the coupons were weighed followed by application of back-protection tape (Kapton) and EPD coating process. Unless, otherwise mentioned below, the aluminum nitride or boron nitride particles were either employed as is or after milling.

Example 1 Electrophoretic Deposition of an Aluminum Nitride (AlN) Coating on a Cu Coupon Followed by Epoxy Back-Fill A slurry formulation was prepared by mixing 9 g of AlN, 180 µL of polyethyleneimine (PEI), and 1 µL of 3-aminopropyl trimethoxysilane (3APTS) in 100 mL of ethanol. The cleaned and primed Cu coupon as described earlier was contacted with the slurry prepared above and AlN was electrophoretically deposited on the Cu coupon using an electrode gap of 5 mm, applied voltage of 40 Volts and deposition time of 60 seconds. The thickness of the AlN coated on the Cu coupon was 225 µm.

Figure 6A:
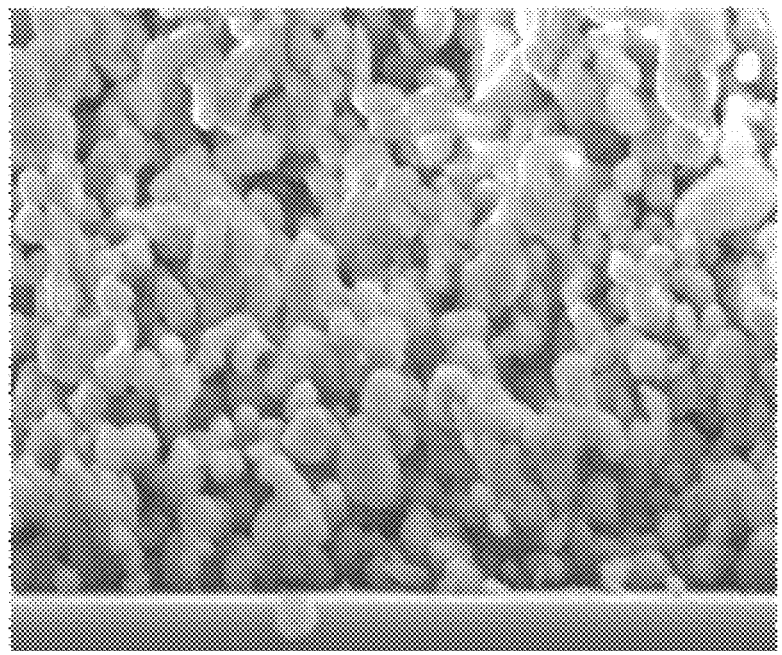
FIG. 6A shows the scanning electron micrograph (SEM) image of a first coating (aluminum nitride (AlN) coating) after the electrophoretic deposition (EPD) process.
Figure 6B:
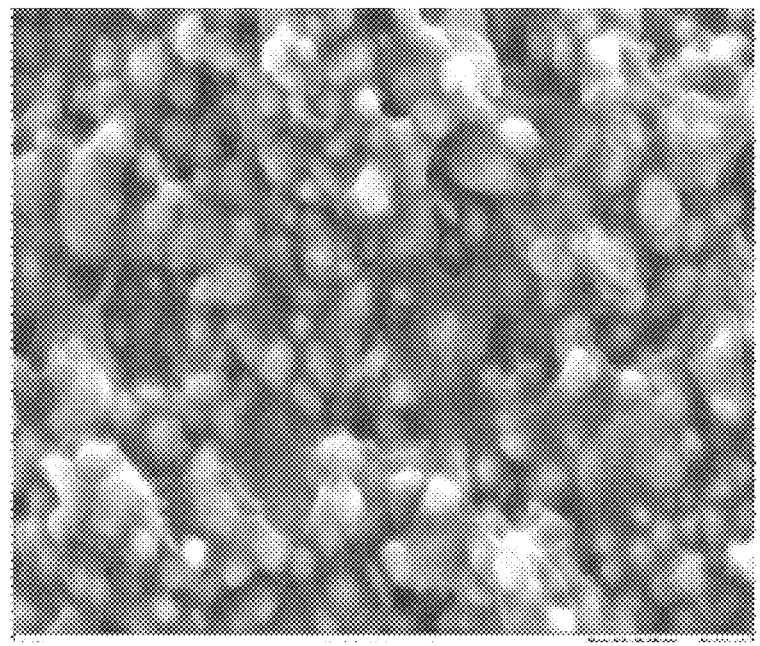
FIG. 6B shows the SEM image of the second coating after the epoxy-resin back fill.

The AlN-coated Cu coupon was placed in a vacuum oven, and heat to a temperature of 100° C. A full vacuum of 2 mBar was applied to the coated coupon in the vacuum oven and the coupon was held for 1 hour under vacuum. The AlN-coated Cu coupon was lowered into an epoxy resin solution at the speed of 100 µm/min followed by lifting it out of the solution at the speed of 100 µm/min. The epoxy resin-impregnated AlN-coated coupon was heated at a temperature of 250° C. until the resin was fully cured. FIG. 6A shows the scanning electron micrograph (SEM) image of a coating after the EPD process. AlN constituted about 50 volume % of the coating deposited using the EPD process. FIG. 6B shows the SEM image of the coating after epoxy-resin back fill. As shown in FIG. 6B, the epoxy resin has infiltrated substantially majority of the voids present in the EPD coating. The average alternating current (AC) breakdown strength of the cured coating was greater than 25 kV/mm and the average thermal conductivity measured was greater than 0.8 W/m·K.

Example 2 Electrophoretic Deposition of an AlN Coating on a Cu Coupon by Varying the Deposition Parameters (A) Varying the Deposition Voltage and AlN Concentration, while Keeping the PEI/AlN Ratio Fixed.

Different EPD-coated samples were prepared, as described above in Example 1, by varying the deposition voltage and AlN concentration, while keeping the PEI/AlN ratio fixed. Table 1 provides the details of the different slurry compositions employed.

TABLE 1

Slurry compositions used for EPD process with varying AlN concentration

| Sample No. | Ethanol (mL) | AlN (g) | PEI (µL) |
|---|---|---|---|
| Sample 1 | 250 | 7.5 | 150 |
| Sample 2 | 250 | 22.5 | 450 |
| Sample 3 | 250 | 50 | 1000 |

Figure 7:
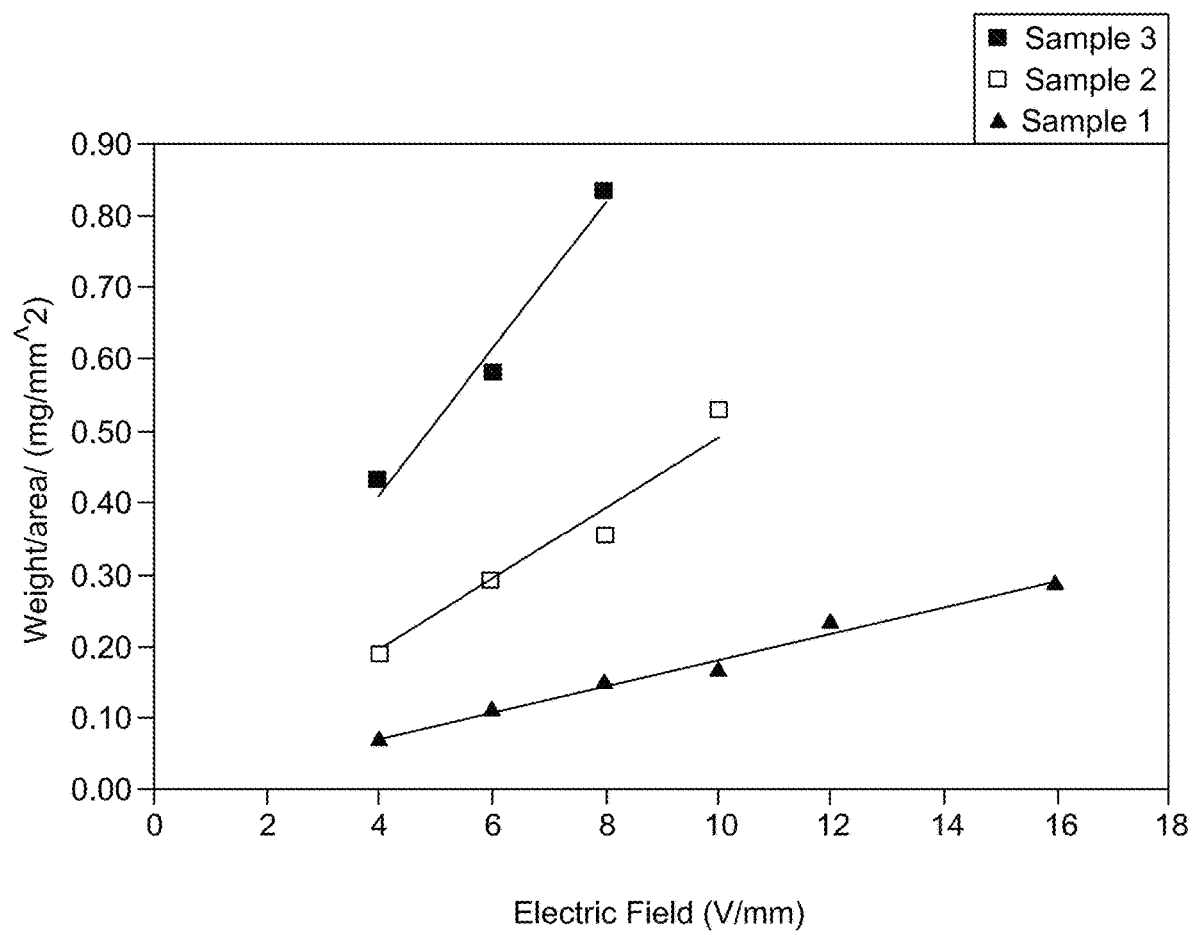
FIG. 7 shows the weight/area (or thickness of the AlN coating) as a function of the applied field for samples 1-3 prepared in accordance with some embodiments of the disclosure.
Figure 8:
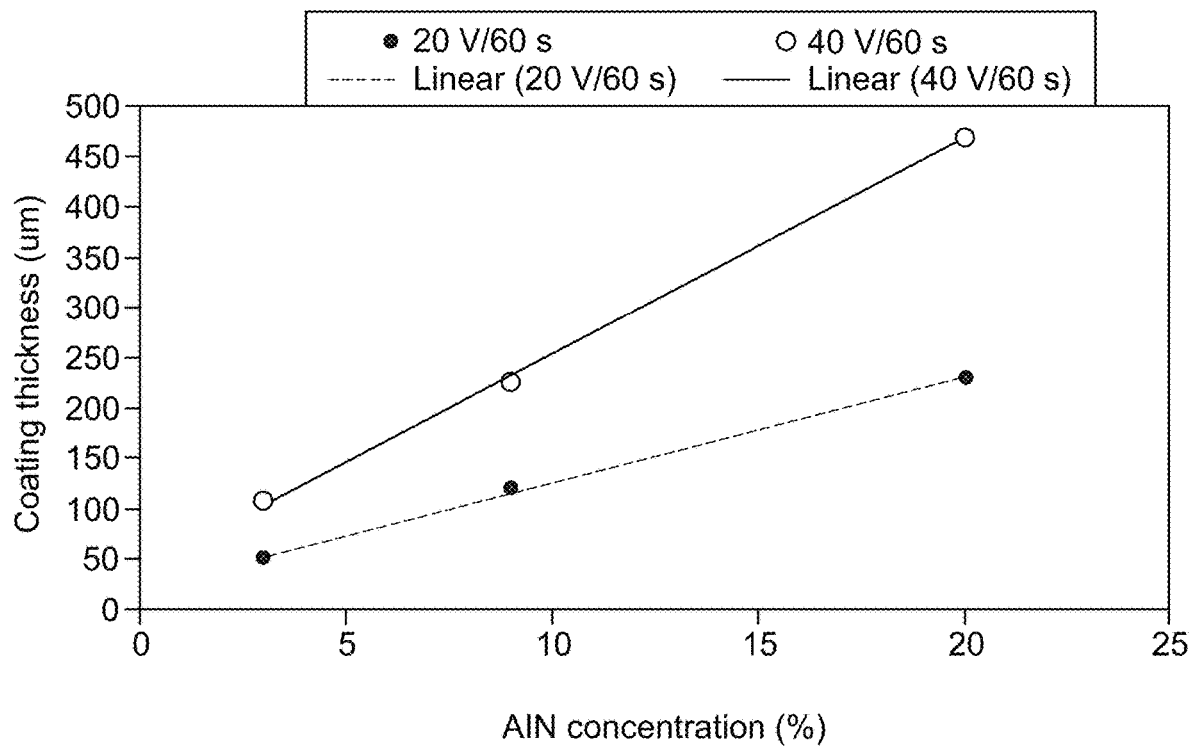
FIG. 8 shows the thickness of the AlN coating as a function of the AlN concentration using two different deposition voltages (20 Volts and 60 Volts)

FIG. 7 shows the weight/area (or thickness of the AlN coating) as a function of the applied field for Samples 1-3 (varying AlN concentration). As shown in FIG. 7, for all the three samples, the thickness of the AlN coating was linearly proportional to the applied field. FIG. 8 shows the thickness of the AlN coating as a function of the AlN concentration using two different deposition voltages (20 Volts and 60 Volts). As shown in FIG. 8, for both the deposition voltages, the thickness of the AlN coating was linearly proportional to the AlN concentration.

(B) Varying the Deposition Voltage and PEI Concentration, while Keeping the AlN Concentration Fixed.

Different EPD-coated samples were prepared, as described above in Example 1, by varying the deposition voltages and PEI concentration, while keeping the AlN concentration fixed. Table 2 provides the details of the different slurry compositions employed.

TABLE 2

Slurry compositions used for EPD process with varying PEI concentration

| Sample No. | Ethanol (mL) | AlN (g) | PEI (µL) |
|---|---|---|---|
| Sample 4 | 250 | 22.5 | 275 |
| Sample 5 | 250 | 22.5 | 450 |
| Sample 6 | 250 | 22.5 | 900 |
| Sample 7 | 250 | 22.5 | 1350 |

Figure 9:
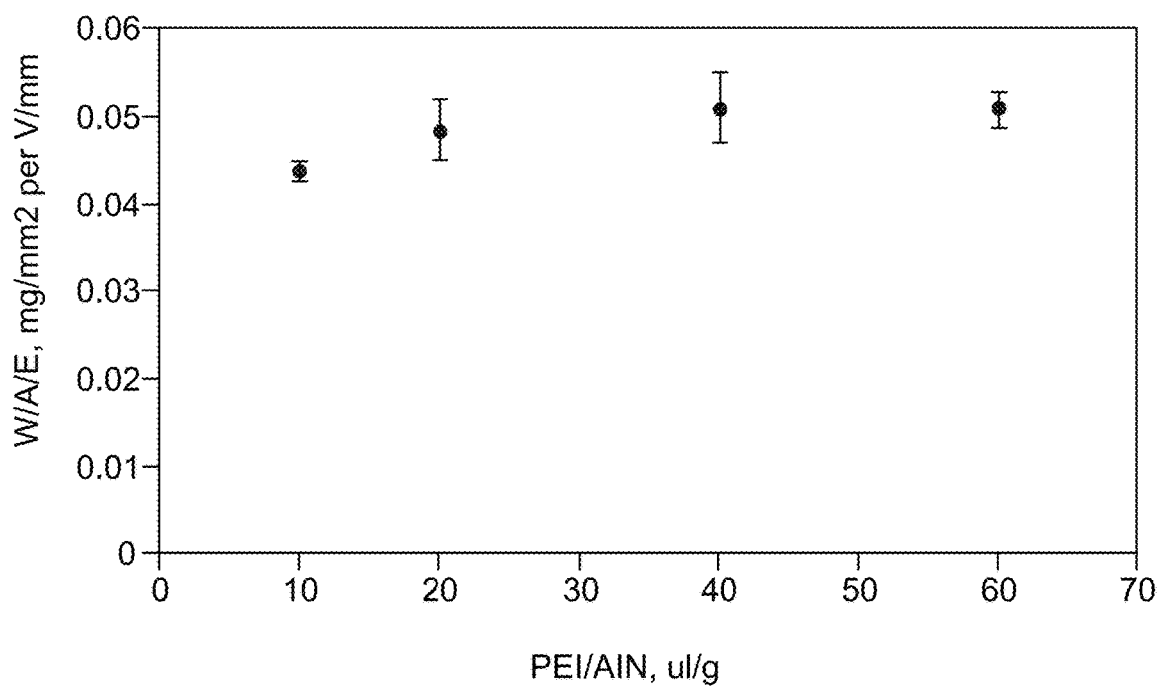
FIG. 9 shows the thickness of the AlN coating as a function of the polyethyleneimine/aluminum nitride (PEI/AlN) ratio.

FIG. 9 shows the thickness of the AlN coating as a function of the PEI/AlN ratio. Therefore, it was observed that the coating thickness is dependent on the AlN concentration rather than the PEI concentration, at the same applied electric field.

(C) Effect of Increasing the AlN Concentration in the Slurry

A slurry was prepared as described in Example 1 using 50 g of AlN, 3 mL of PEI in 100 mL of ethanol. The slurry was electrophoretically coated on a coupon using the EPD process described above in Example 1 by varying the voltage that was applied for 20 s using an electrode gap of 5 mm. The coated film did not show any dry film cracking even at the higher concentrations of AlN in the slurry, when PEI/AlN was above 30 µL/g.

Example 3 Electrophoretic Deposition of an AlN Coating on a Steel Laminate Statorette Followed by Epoxy Back-Fill A slurry formulation was prepared by mixing 50 g of AlN and 2 mL of PEI in 100 mL of ethanol. The steel laminate core slots of the statorette were cleaned from any grease followed by rinsing. The cleaned slots were then placed in an etchant solution for about 30 seconds. This was followed by distilled water wash and cleanse drying before deposition. The cleaned statorette was then contacted with the slurry prepared above and AlN was electrophoretically deposited on the slots using different electrode configurations.

Figure 10A:
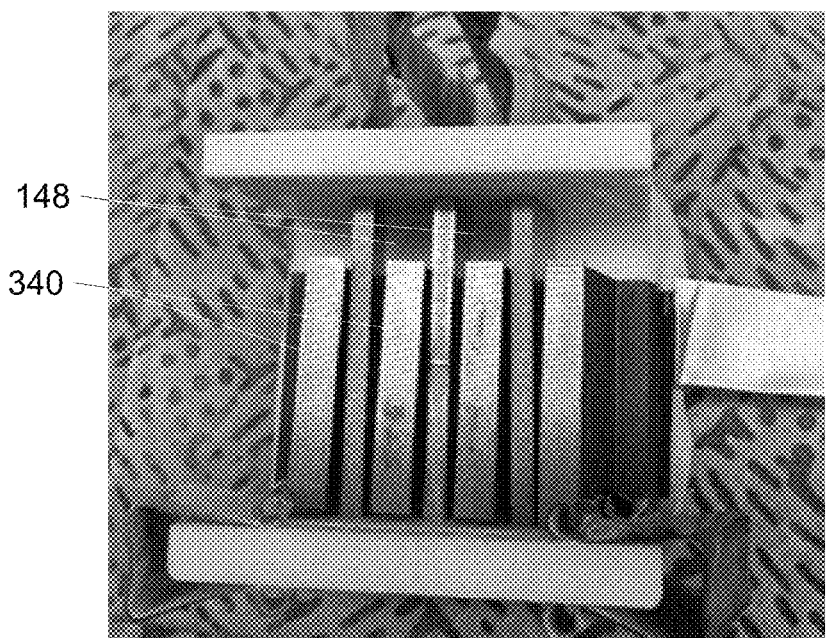
FIG. 10A shows an electrode configuration in which a plurality of electrodes was placed in individual slots during the EPD process, in accordance with some embodiments of the disclosure.
Figure 10B:
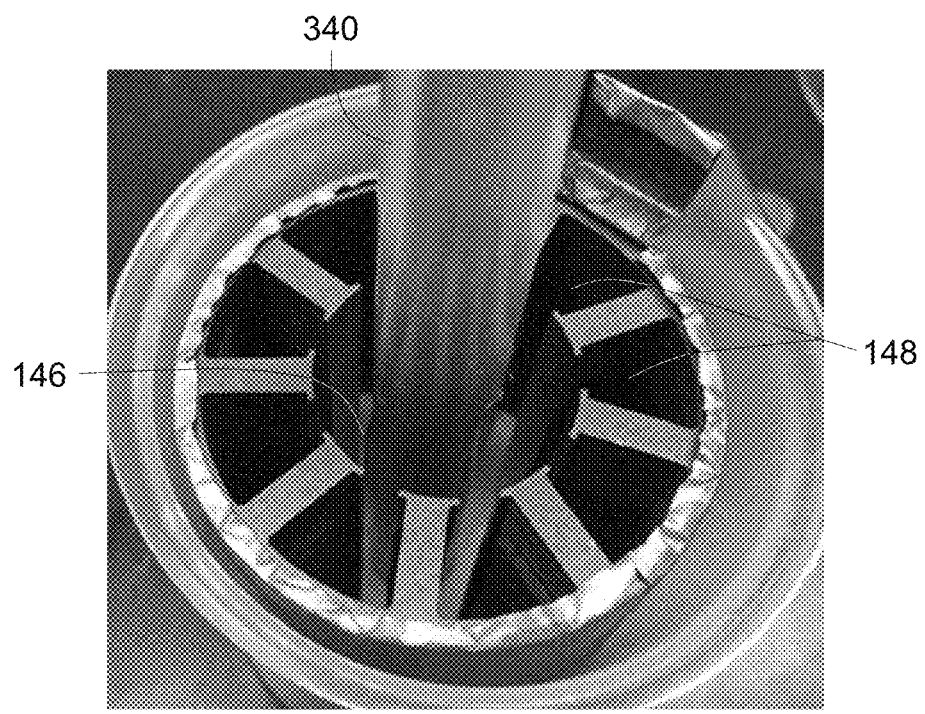
FIG. 10B shows an electrode configuration in which a single electrode was placed in the stator bore during the EPD process, in accordance with some embodiments of the disclosure.

FIG. 10A shows an electrode configuration in which a plurality of electrodes was placed in individual slots. The electrode gap using this configuration was 5 mm, deposition voltage was 40 Volts and deposition time was 60 seconds. FIG. 10B shows an electrode configuration in which a single electrode was placed in the stator bore. The electrode gap using this configuration was about 7 mm, deposition voltage was 100 Volts, and deposition time was 120 seconds.

The AlN-coated statorette was placed in a container in an autoclave along with an application of vacuum for 30 minutes. Following the application of the vacuum, epoxy resin was allowed to enter the autoclave from the bottom of the container, until the statorette was fully immersed in the epoxy resin. After complete immersion of the statorette in the epoxy resin, the autoclave was held under vacuum for 30 minutes, followed by application of 100 psi $N_2$ to the autoclave and holding the autoclave under pressure for ~1.5 hours. This vacuum and pressure cycle was repeated a few times to ensure that the epoxy resin is fully penetrated into the AlN coating. After taking the statorette out from the autoclave, the excess resin was drained and coating was cured in an oven using the resin curing profile. The uniformity of the coating obtained using the electrode configuration of FIG. 10A was better than the uniformity of the coating obtained using the electrode configuration of FIG. 10B.

Example 4 Electrophoretic Deposition of an AlN Coating on a Hiperco 50™ Coupon Followed by Silicone Resin Back-Fill A slurry formulation was prepared by mixing 90 g of AlN, 3600 µL of PEI (10000 MW branched, 50% in ethanol) in 450 mL of ethanol. The slip was prepared by ultrasonicating the mixture with small horn in a 600 ml metal beaker with ice bath cooling and no magnetic stirring for 3 min active sonication time, using an amplitude of 80%. The cleaned and primed Hiperco 50™ coupons, as described earlier, were contacted with the slurry prepared above and AlN was electrophoretically deposited on the coupons using an electrode gap of 5 mm, applied voltage of 25 Volts and deposition time of 20 seconds.

Hardsil™ (from Gelest) silicone resin for dip coating was prepared by mixing 99% part A with 1% part B, followed by degassing the mixture under house vacuum at room temperature until bubbles were almost gone. The AlN-coated coupons were placed in a vacuum oven, and heated to a temperature of 100° C. A full vacuum of 2 mBar was applied to the coated coupons in the vacuum oven and the coupons were held for 1 hour under vacuum. The AlN-coated coupons were lowered into the silicone resin solution at the speed of 100 µm/min followed by lifting them out of the solution at the speed of 500 µm/min. The silicone resin-impregnated AlN-coated coupons were heated at 150° C. for 6 hours (1 min ramp heating time), and 200° C. for 2 hours (15 min. ramp heating time). This was followed by heating at 250° C. for 2 hours (15 min. ramp heating time) and 5 hours of cooling to room temperature. The average alternating current (AC) breakdown strength of the cured coating was greater than 25 kV/mm.

Example 5 Electrophoretic Deposition of an AlN Coating on Cu and Hiperco 50™ Coupons Using Different Charging Agents, Followed by Silicone Resin Back-Fill A slurry formulation was prepared by mixing 90 g of AlN and 5400 µL of the charging agent in 450 mL of ethanol.

Two different charging agents from Gelest were used: trimethoxysilylpropyl-modified polyethyleneimine (TMSP-PEI) 56 wt % in in IPA and aminoethylamino/vinyl/silsesquioxane 26 wt % in aqueous solution. The slips were prepared by ultrasonicating the mixture with small horn in a 600 ml metal beaker with ice bath cooling and no magnetic stirring for 3 min active sonication time, using an amplitude of 80%. The cleaned and primed Cu and Hiperco 50™ coupons, as described earlier, were contacted with the slurry prepared above and AlN was electrophoretically deposited on the coupons using an electrode gap of 5 mm, applied voltage of 45 Volts and deposition time of 20 seconds. The thickness of the AlN coated on the coupons was about 100 μm.

Hardsil™ (from Gelest) silicone resin for dip coating was prepared by mixing 99% part A with 1% part B, followed by degassing the mixture under house vacuum at room temperature until bubbles were almost gone. The AlN-coated coupons were placed in a vacuum oven, and heated to a temperature of 100° C. A full vacuum of 2 mBar was applied to the coated coupons in the vacuum oven and the coupons were held for 1 hour under vacuum. The AlN-coated coupons were lowered into the silicone resin solution at the speed of 100 μm/min followed by lifting them out of the solution at the speed of 500 μm/min. The silicone resin-impregnated AlN-coated coupons were heated at 150° C. for 6 hours (1 min ramp heating time), and 200° C. for 2 hours (15 min. ramp heating time). This was followed by heating at 250° C. for 2 hours (15 min. ramp heating time) and 5 hours of cooling to room temperature. The average alternating current (AC) breakdown strength of the cured coating was greater than 25 kV/mm.

Example 6 Electrophoretic Deposition of a Boron Nitride (BN) Coating on Cu and Steel Coupons Followed by Silicone Resin Back-Fill A slurry formulation was prepared by mixing 13 g of BN, 400 μL of PEI (10000 MW branched, 50% in ethanol) in 150 mL of ethanol. The cleaned and primed Cu and steels coupons, as described earlier, were contacted with the slurry prepared above and BN was electrophoretically deposited on the coupons using an electrode gap of 10 mm, applied voltage of 30 Volts and deposition time of 60 seconds. The thickness of the BN coated on the coupons was about 140 μm.

Hardsil™ (from Gelest) silicone resin for dip coating was prepared by mixing 99% part A with 1% part B, then degassing the mixture under house vacuum at room temperature until bubbles were almost gone. The BN-coated Cu coupons were placed in a vacuum oven, and heated to a temperature of 100° C. A full vacuum of 2 mBar was applied to the coated coupons in the vacuum oven and the coupons were held for 1 hour under vacuum. The BN-coated coupons were lowered into the silicone resin solution at the speed of 100 μm/min followed by lifting them out of the solution at the speed of 500 μm/min. The silicone resin-impregnated BN-coated coupons were heated at 150° C. for 6 hours (I min ramp heating time), and 200° C. for 2 hours (15 min. ramp heating time). This was followed by heating at 250° C. for 2 hours (15 min. ramp heating time) and 5 hours of cooling to room temperature. The average alternating current (AC) breakdown strength of the cured coating was greater than 60-70 kV/mm.

The appended claims are intended to claim the invention as broadly as it has been conceived and the examples herein presented are illustrative of selected embodiments from a manifold of all possible embodiments. Accordingly, it is the Applicants' intention that the appended claims are not to be limited by the choice of examples utilized to illustrate features of the present disclosure. As used in the claims, the word "comprises" and its grammatical variants logically also subtend and include phrases of varying and differing extent such as for example, but not limited thereto, "consisting essentially of" and "consisting of." Where necessary, ranges have been supplied; those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

The invention claimed is:

1. A method of forming an electrically insulating coating on a component of an electrical machine, comprising:
   coating a surface of the component with a ceramic material comprising a nitride, via an electrophoretic process, to form a first coating;
   contacting the first coating deposited by the electrophoretic process with a thermoset resin to form a second coating; and
   curing the thermoset resin in the second coating to form the electrically insulating coating comprising the ceramic material dispersed in a polymer matrix;
   wherein the component of the electrical machine is an additively-manufactured stator component or a rotor component.

2. The method of claim 1, wherein the nitride comprises boron nitride, aluminum nitride, or a combination thereof.

3. The method of claim 1, wherein the thermoset resin comprises epoxy, siloxane, polyester, polyurethane, cyanate ester, polyimide, polyamide, polyamideimide, polyesterimide, polyvinyl ester, or combinations thereof.

4. The method of claim 1, wherein the thermoset resin comprises epoxy, silicone, or a combination thereof.

5. The method of claim 1, wherein the electrophoretic process comprises contacting the surface of the component with a coating composition comprising the ceramic material and a charging agent.

6. The method of claim 5, wherein the charging agent comprises iodine, polyethyleneimine, alkoxysilylalkyl-modified polyethyleneimine, silsesquioxane, or combinations thereof.

7. The method of claim 5, wherein a concentration of the ceramic material in the coating composition is in a range from about 20 volume % to about 60 volume %.

8. The method of claim 1, wherein the first coating is contacted with the thermoset resin via an immersion process or a vacuum pressure impregnating process.

9. The method of claim 1, wherein the component is a stator assembly comprising a stator core and a stator coil, and the method comprises simultaneously coating the surfaces of the stator core and the stator coil with the electrically insulating coating.

10. The component of the electrical machine comprising the surface coated with the electrically insulating coating using the method of claim 1.

11. An electrical motor comprising the component of claim 10.

12. A method of forming a coating on a component of an electrical machine, comprising:
    coating a surface of the component with a ceramic material, via an electrophoretic process, to form a first coating;
    contacting the first coating deposited by the electrophoretic process with a polymeric material to form a second coating; and
    curing or melting the polymeric material in the second coating to form the coating comprising the ceramic material dispersed in a polymer matrix.

13. The method of claim 12, wherein the ceramic material comprises aluminum nitride, boron nitride, aluminum oxide, diamond, or combinations thereof.

14. The method of claim 12, wherein the ceramic material comprises aluminum nitride, boron nitride, or a combination thereof.

15. The method of claim 12, wherein the polymeric material comprises a thermoset resin selected from the group consisting of epoxy, siloxane, polyester, polyurethane, cyanate ester, polyimide, polyamide, polyamideimide, polyesterimide, polyvinyl ester, and combinations thereof.

16. The method of claim 12, wherein the polymeric material comprises a thermoplastic selected from the group consisting of polyetheretherketone (PEEK), polyetherketone (PEK), polyetherketoneketone (PEKK), perfluoroalkoxy alkane (PFA), polytetrafluoroethylene (PTFE), polyethersulfone (PES), and combinations thereof.

17. The method of claim 12, wherein the electrophoretic process comprises contacting the surface of the component with a coating composition comprising the ceramic material and a charging agent.

18. The method of claim 17, wherein the charging agent comprises iodine, polyethyleneimine, alkoxysilylalkyl-modified polyethyleneimine, silsesquioxane, or combinations thereof.

19. The method of claim 17, wherein a concentration of the ceramic material in the coating composition is in a range from about 20 volume % to about 60 volume %.

20. The method of claim 12, wherein the component is a stator assembly comprising a stator core and a stator coil, and the method comprises simultaneously coating the surfaces of the stator core and the stator coil with the coating.

* * * * *